(12) United States Patent
Hung

(10) Patent No.: US 11,045,285 B2
(45) Date of Patent: Jun. 29, 2021

(54) ORTHODONTIC SPACE CLOSURE DEVICE

(71) Applicant: Cheng-Hsiang Hung, New Taipei (TW)

(72) Inventor: Cheng-Hsiang Hung, New Taipei (TW)

( * ) Notice: Subject to any disclaimer, the term of this patent is extended or adjusted under 35 U.S.C. 154(b) by 93 days.

(21) Appl. No.: 16/234,254

(22) Filed: Dec. 27, 2018

(65) Prior Publication Data
US 2019/0201166 A1 Jul. 4, 2019

Related U.S. Application Data

(60) Provisional application No. 62/611,154, filed on Dec. 28, 2017, provisional application No. 62/687,996, filed on Jun. 21, 2018.

(51) Int. Cl.
A61C 7/08 (2006.01)
A61C 7/30 (2006.01)
A61C 7/20 (2006.01)
A61C 7/22 (2006.01)

(52) U.S. Cl.
CPC .............. A61C 7/303 (2013.01); A61C 7/08 (2013.01); A61C 7/20 (2013.01); A61C 7/22 (2013.01)

(58) Field of Classification Search
CPC .............. A61C 7/08; A61C 7/303; A61C 7/20
See application file for complete search history.

(56) References Cited

U.S. PATENT DOCUMENTS

| 4,799,500 A * | 1/1989 | Newbury | A61F 5/01 128/859 |
| 8,485,197 B2 * | 7/2013 | Metz | A61C 7/08 128/848 |
| 8,567,408 B2 * | 10/2013 | Roettger | A63B 71/085 128/861 |
| 9,572,971 B2 * | 2/2017 | Su | A61C 7/282 |
| 10,111,730 B2 * | 10/2018 | Webber | A61C 7/36 |
| 10,932,887 B2 * | 3/2021 | Hung | A61C 7/08 |

(Continued)

FOREIGN PATENT DOCUMENTS

EP 3216418 A1 9/2017
KR 10-1343129 B1 12/2013
(Continued)

OTHER PUBLICATIONS

European Patent Office, Search Report, Patent Application Serial No. 18248087.1, dated Apr. 23, 2019, Europe.

Primary Examiner — Ralph A Lewis

(57) ABSTRACT

An orthodontic space closure device is provided, including a first tooth cap unit, a second tooth cap unit, and a number of elastic members. The first tooth cap unit is configured to be removably worn on the anterior teeth of a dental arch of a patient. At least one first connector is fixed on each buccal side of the first tooth cap unit. The second tooth cap unit is configured to be removably worn on the posterior teeth of the dental arch. A vertical extension part is formed on each buccal side of the second tooth cap unit, and at least one second connector is fixed on each vertical extension part. The elastic members couple the first connectors to the second connectors, thereby exerting elastic traction forces having horizontal and vertical components on the first tooth cap unit to achieve retraction and intrusion of the anterior teeth.

10 Claims, 8 Drawing Sheets

(56) References Cited

U.S. PATENT DOCUMENTS

| | | | |
|---|---|---|---|
| 2010/0279245 A1* | 11/2010 | Navarro | A61C 7/08 433/6 |
| 2012/0129117 A1* | 5/2012 | McCance | A61C 7/10 433/7 |
| 2015/0118635 A1* | 4/2015 | Kwon | A61C 7/145 433/20 |
| 2015/0257856 A1* | 9/2015 | Martz | A61C 7/14 433/6 |
| 2016/0120624 A1* | 5/2016 | Yousefian | A61C 7/282 433/17 |
| 2017/0258554 A1* | 9/2017 | Hung | A61C 7/08 |

FOREIGN PATENT DOCUMENTS

| | | |
|---|---|---|
| TW | 541943 | 7/2003 |
| TW | I601515 | 10/2017 |
| WO | WO 2009/126433 A2 | 10/2009 |

* cited by examiner

ORTHODONTIC SPACE CLOSURE DEVICE

CROSS REFERENCE TO RELATED APPLICATIONS

The present application claims the benefit of U.S. Provisional Patent Application No. 62/611,154, filed Dec. 28, 2017, and U.S. Provisional Patent Application No. 62/687,996, filed Jun. 21, 2018, the entirety of which are incorporated by reference herein.

BACKGROUND OF THE INVENTION

Field of the Invention

The present application relates to an orthodontic correction technology; and in particular to an orthodontic space closure device.

Description of the Related Art

Misaligned teeth can adversely affect a person's dental aesthetics, functions, and health. The goal of orthodontic correction is to bring the teeth into proper alignment by using appliances which exert mechanical forces to move the teeth to positions or orientations where the dental functions and aesthetics are improved.

Dental protrusion is a common condition requiring orthodontic treatment. Dentoalveolar protrusion of the maxillary or both the maxillary and mandibular (bimaxillary) anterior teeth results in a convex facial profile. The current treatment for maxillary or bimaxillary protrusion is to extract the first or second premolars, thereby creating a space for anterior teeth retraction. The space closure step is a challenge, calling for an effective mechanism to achieve smooth retraction of the anterior teeth.

A conventional orthodontic space closure device consists of a first tooth cap unit coupled to the anterior teeth, a second tooth cap unit coupled to the posterior teeth to act as anchorage, and elastic members connecting the first and second tooth cap units to exert elastic traction forces on the first tooth cap unit to retract the anterior teeth distally. However, in the process of retraction, a common problem known as the bowing effect, in which the anterior teeth tend to tip distally and the posterior teeth tip mesially, occurs.

BRIEF SUMMARY OF THE INVENTION

In view of the aforementioned problems, an object of the invention is to provide an orthodontic space closure device capable of achieving smooth retraction of the anterior teeth while preventing the bowing effect in the process of retraction.

According to some embodiments, an orthodontic space closure device is provided, including a first tooth cap unit, a second tooth cap unit, and a number of elastic members. The first tooth cap unit is configured to be removably worn on the anterior teeth of a dental arch of a patient. At least one first connector is fixed on each buccal side of the first tooth cap unit. The second tooth cap unit is configured to be removably worn on the posterior teeth of the dental arch. A vertical extension part is formed on each buccal side of the second tooth cap unit, and at least one second connector is fixed on each vertical extension part. The elastic members couple the first connectors on the buccal sides of the first tooth cap unit to the second connectors on the buccal sides of the second tooth cap unit, thereby exerting elastic traction forces having horizontal and vertical components on the first tooth cap unit to achieve retraction and intrusion of the anterior teeth.

In some embodiments, a second connector and each of the first connectors have a vertical height difference therebetween.

In some embodiments, the second tooth cap unit includes two second tooth cap segments configured to be removably worn on the posterior teeth. Each of the second tooth cap segments has a vertical extension part formed on its buccal side.

In some embodiments, the orthodontic space closure device further includes a third tooth cap unit and a number of additional elastic members. The third tooth cap unit includes two third tooth cap segments configured to be removably worn on the two canines of the dental arch between the anterior teeth excluding the canines and the posterior teeth. The additional elastic members couple the third tooth cap segments to the second tooth cap segments, thereby exerting elastic traction forces on the third tooth cap segments to achieve retraction of the canines In some embodiments, the second tooth cap unit further includes a transverse bar connecting the two second tooth cap segments together, and the transverse bar extends toward and almost touches the palate or the floor of the mouth of the patient.

In some embodiments, at least one anterior extension part extends anteriorly from the transverse bar. At least one third connector is formed on the anterior extension part.

In some embodiments, the second tooth cap unit further includes a labial bar connecting to the top ends of the vertical extension parts on the buccal sides of the two second tooth cap segments and arranged along the vestibule of the mouth of the patient. At least one fourth connector is formed on the labial bar.

In some embodiments, the orthodontic space closure device further includes an additional elastic member coupling the fourth connector on the labial bar to the third connector on the anterior extension part and extending across the first tooth cap unit, thereby exerting elastic traction forces on the first tooth cap unit to achieve retraction and/or intrusion of the anterior teeth.

In some embodiments, a number of fifth connectors are arranged on the buccal sides of the second tooth cap unit. The orthodontic space closure device further includes an orthodontic archwire engaging with the first connectors on the buccal sides of the first tooth cap unit and the fifth connectors and arranged along the labial side of the first tooth cap unit so as to guide movement of the first tooth cap unit.

In some embodiments, the labial side of the first tooth cap unit forms an archwire groove for engaging with the orthodontic archwire. There is a vertical discrepancy between the archwire groove and the orthodontic archwire in its original unengaged shape.

In some embodiments, an orthodontic space closure device is provided, including a second tooth cap unit including two second tooth cap segments configured to be removably worn on the posterior teeth of a dental arch of a patient. The second tooth cap unit further includes an anterior teeth stop position plate extending from the two second tooth cap segments and having a shape for receiving the anterior teeth at their target retracted positions.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
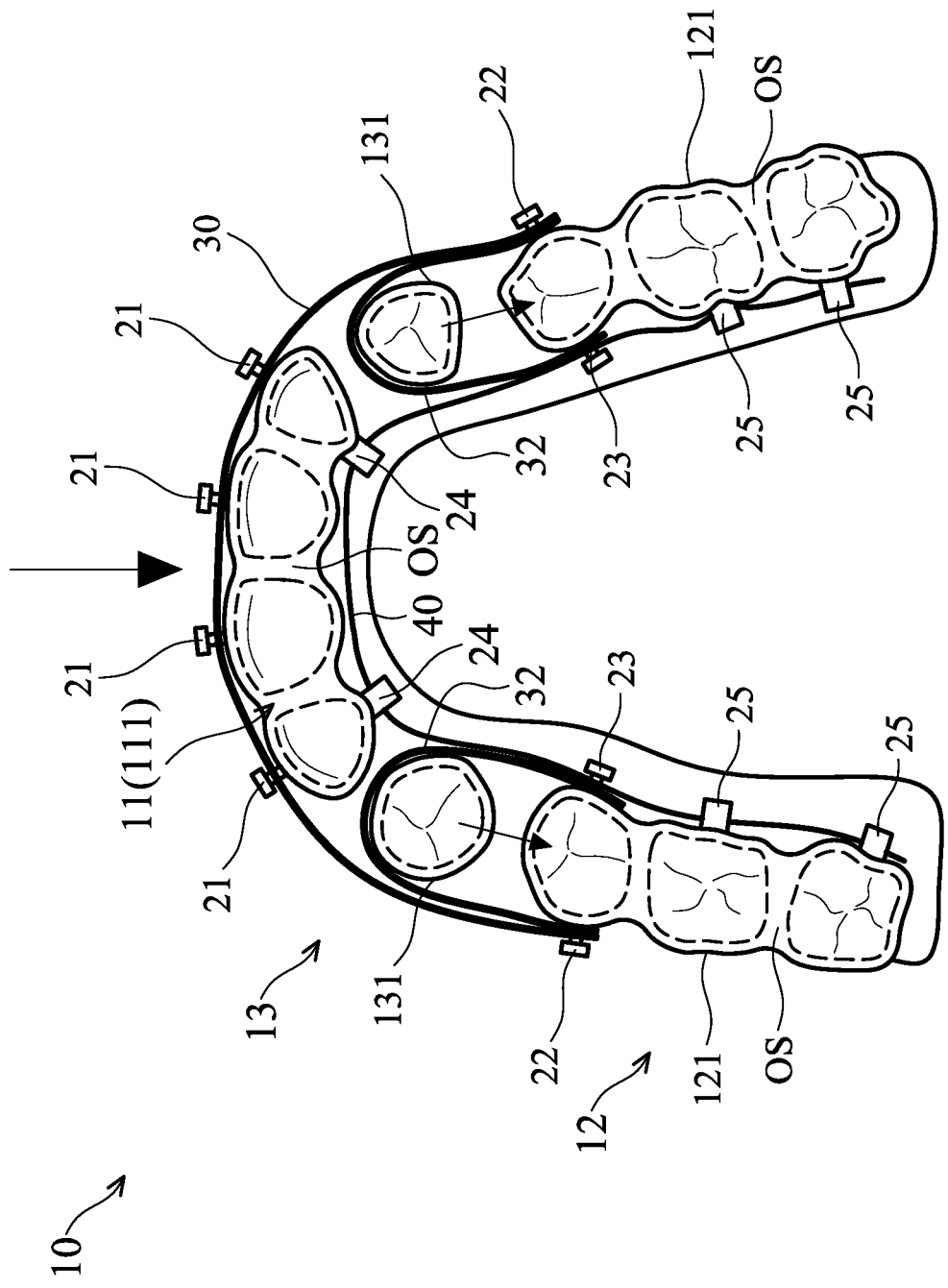
FIG. 1 is a schematic view showing an orthodontic space closure device in accordance with some embodiments being worn on a dental arch of a patient, when viewed from the occlusal surface of the device.

In order to illustrate the purposes, features, and advantages of the invention, the preferred embodiments and drawings of the invention are shown in detail as follows.

In the following detailed description, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly.

In addition, the present disclosure may repeat reference numerals and/or letters in the various examples. This repetition is for the purpose of simplicity and clarity and does not in itself dictate a relationship between the various embodiments and/or configurations discussed. Various features may be arbitrarily drawn in different scales for the sake of simplicity and clarity.

Generally, the present disclosure provides example embodiments relating to orthodontic space closure devices capable of achieving smooth retraction of the anterior teeth while preventing the bowing effect in the process of retraction. Some variations of the embodiments are described. Throughout the various views and illustrative embodiments, common elements use the same reference number.

Figure 2:
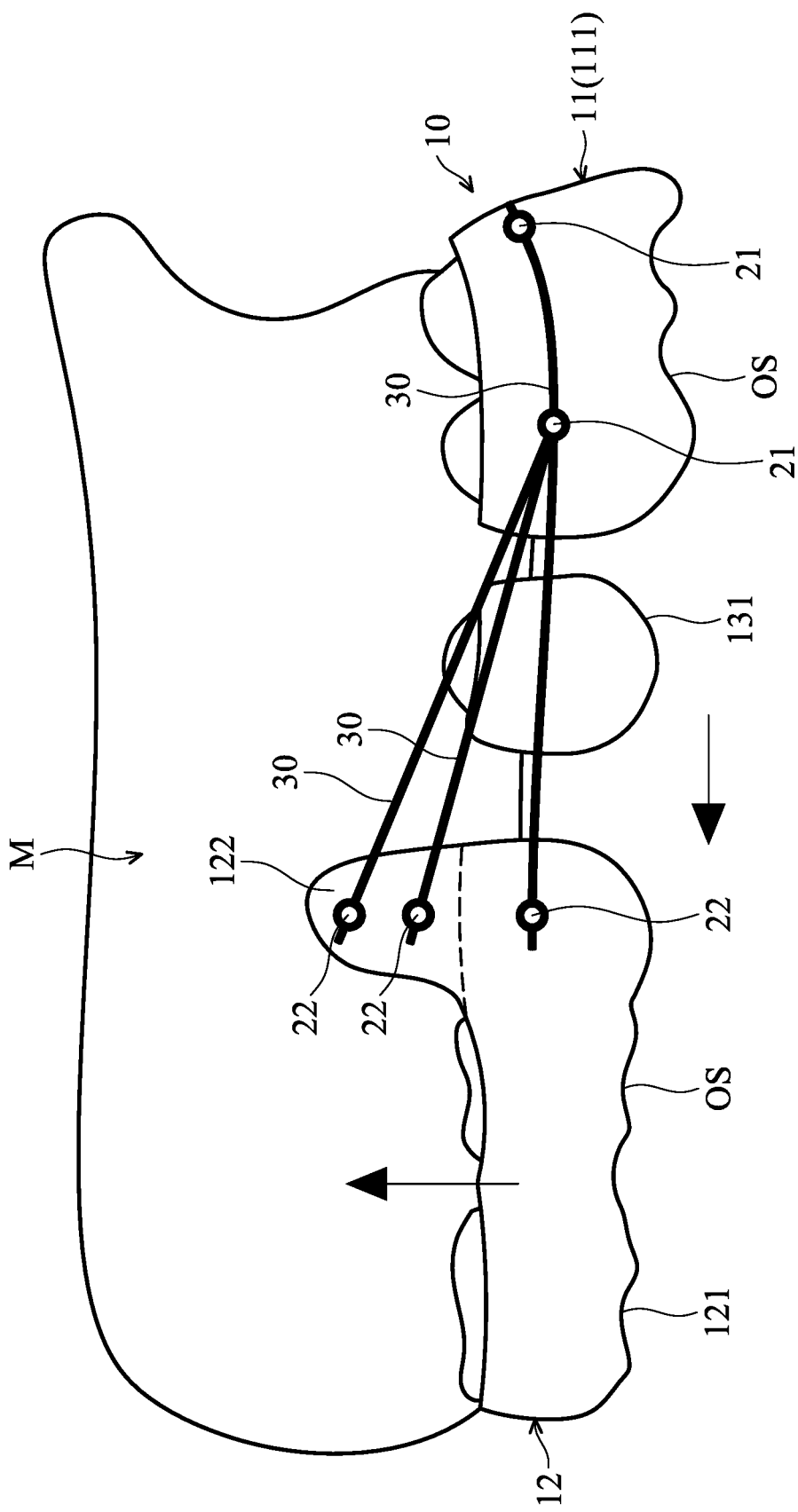
FIG. 2 is a schematic side view of the orthodontic space closure device in FIG. 1.

FIG. 1 is a schematic view showing an orthodontic space closure device 10 in accordance with some embodiments being worn on a dental arch of a patient, when viewed from the occlusal surface of the device. FIG. 2 is a schematic side view of the orthodontic space closure device 10 in FIG. 1. As shown in FIGS. 1 and 2, the orthodontic space closure device 10 includes a first tooth cap unit 11 and a second tooth cap unit 12. The first tooth cap unit 11 may be configured to be removably worn on the anterior teeth (e.g., the incisors and lateral incisors) of a dental arch M (the maxillary or mandibular dental arch) to be retracted. The second tooth cap unit 12 may be configured to be removably worn on the posterior teeth (e.g., the second premolar, the first molars and second molars) and act as an anchorage for several elastic members to exert elastic correction forces on the anterior teeth inside the first tooth cap unit 11 (which will be illustrated further later). Before the orthodontic space closure device 10 is worn, the first premolars are extracted so as to create a space for anterior teeth retraction.

The first tooth cap unit 11 may include a rigid shell 111 (also called first tooth cap segment 111) which has several tooth receiving cavities formed on the inner surface (not shown) for receiving the anterior teeth. The rigid shell 111 also has an occlusal surface OS (see FIGS. 1 and 2) formed on the outer surface and opposite the inner tooth receiving cavities. The second tooth cap unit 12 may include two rigid shells or second tooth cap segments 121, each having several tooth receiving cavities (not shown) formed on the inner surface for receiving the posterior teeth on the left or right side of the dental arch M. Each second tooth cap segment 121 also has an occlusal surface OS formed on the outer surface and opposite the inner tooth receiving cavities. In some embodiments, the first and second tooth cap segments 111 and 121 may be made of orthodontic resin. Alternatively, the first and second tooth cap segments 111 and 121 may be made of metal or other materials suitable for use in oral applications.

In some embodiments, as shown in FIGS. 1 and 2, a number of first connectors 21 are fixed on the labial side and the (left and right) buccal sides of the first tooth cap unit 11. A number of second connectors 22 are also fixed on the (left and right) buccal sides of the second tooth cap unit 12 (i.e., formed on the buccal side of each second tooth cap segment 121). Moreover, each second tooth cap segment 121 has a vertical extension part 122 (for example, the part of the second tooth cap segment 121 above the dotted line depicted in FIG. 2) formed on the buccal side and extending vertically in a direction away from the occlusal surface OS. One or more second connectors 22 are also fixed on the outer surface of the vertical extension part 122, so that each second connector 22 on the vertical extension part 122 and each first connector 21 on the buccal side of the first tooth cap unit 11 have a vertical height difference therebetween. The first and second connectors 21 and 22 are configured to install the elastic members described below. In various embodiments, each of the first and second connectors 21 and 22 can be a hook, a button, a tube, a bracket, or the like according to the actual requirements.

The orthodontic space closure device 10 also includes one or more elastic members 30 configured to couple the first connectors 21 fixed on the first tooth cap unit 11 to the second connectors 22 fixed on the second tooth cap unit 12. In some embodiments, as shown in FIG. 2, the orthodontic space closure device 10 includes one elastic member 30 coupling the first connectors 21 fixed on the labial and buccal sides of the first tooth cap unit 11 to the second connectors 22 fixed on the buccal sides of the second tooth cap unit 12, and several elastic members 30 coupling the first connectors 21 fixed on the buccal sides of the first tooth cap unit 11 to the second connectors 22 fixed on the vertical extension parts 122 on both buccal sides. However, it should be appreciated that many variations and modifications can be made to the arrangement of the elastic members 30. In various embodiments, each of the elastic members 30 can be an elastic thread, a rubber band, a power chain, or the like according to the actual requirements.

With the above configuration (in particular, the second tooth cap unit 12 including the vertical extension parts 122 on both buccal sides and the second connectors 22 on the vertical extension parts 122), the elastic members 30 exert elastic traction forces having horizontal and vertical components (as indicated by the up and left arrows in FIG. 2) on the first tooth cap unit 11 to achieve retraction and intrusion of the anterior teeth while the second tooth cap unit 12 mounted on the posterior teeth acts as anchorage. As a result, the bowing effect occurring during the process of retraction is prevented.

It should be realized that the canines have long roots, which makes it difficult to move the canines together with the incisors as a group. To address this, the orthodontic space closure device 10 also includes a third tooth cap unit 13 including two rigid shells or third tooth cap segments 131 (having a similar structure to the first tooth cap segment 111 or second tooth cap segments 121) configured to be removably worn on the canines on both sides of the dental arch M, and includes a number of (e.g., two) elastic members 32 configured to couple the third tooth cap segments 131 of the third tooth cap unit 13 to the second tooth cap segments 121 of the second tooth cap unit 12. As shown in FIG. 1, each elastic member 32 couples a second connector 22 on the buccal side of a second tooth cap segment 121 to another connector 23 (e.g., a hook, a button, or the like) on the lingual side of the second tooth cap segment 121 and extends across a third tooth cap segment 131 (although not shown, each third tooth cap segment 131 may have one or more elastic member holding features, such as notches or the like, for holding or engaging with the elastic member 32). Accordingly, the elastic members 32 exert elastic traction forces on the third tooth cap segments 131 of the third tooth cap unit 13 to achieve horizontal retraction of the canines. Since the canines are retracted separately, retraction of the anterior teeth excluding the canines can be faster (i.e., the correction efficiency is improved).

In some embodiments, the orthodontic space closure device 10 further includes an orthodontic archwire 40 (e.g., a thermal Ni—Ti wire) disposed along the lingual side (see FIG. 1). A number of connectors 24 and 25 (e.g., tubes, brackets, or the like) are fixed on the lingual sides of the first and second tooth cap segments 111 and 121, respectively, for installing the orthodontic archwire 40. The orthodontic archwire 40 arranged along the lingual side of the first tooth cap segment 111 can guide the first tooth cap unit 11 (and the anterior teeth) to move stably toward the second tooth cap unit 12.

Figure 3:
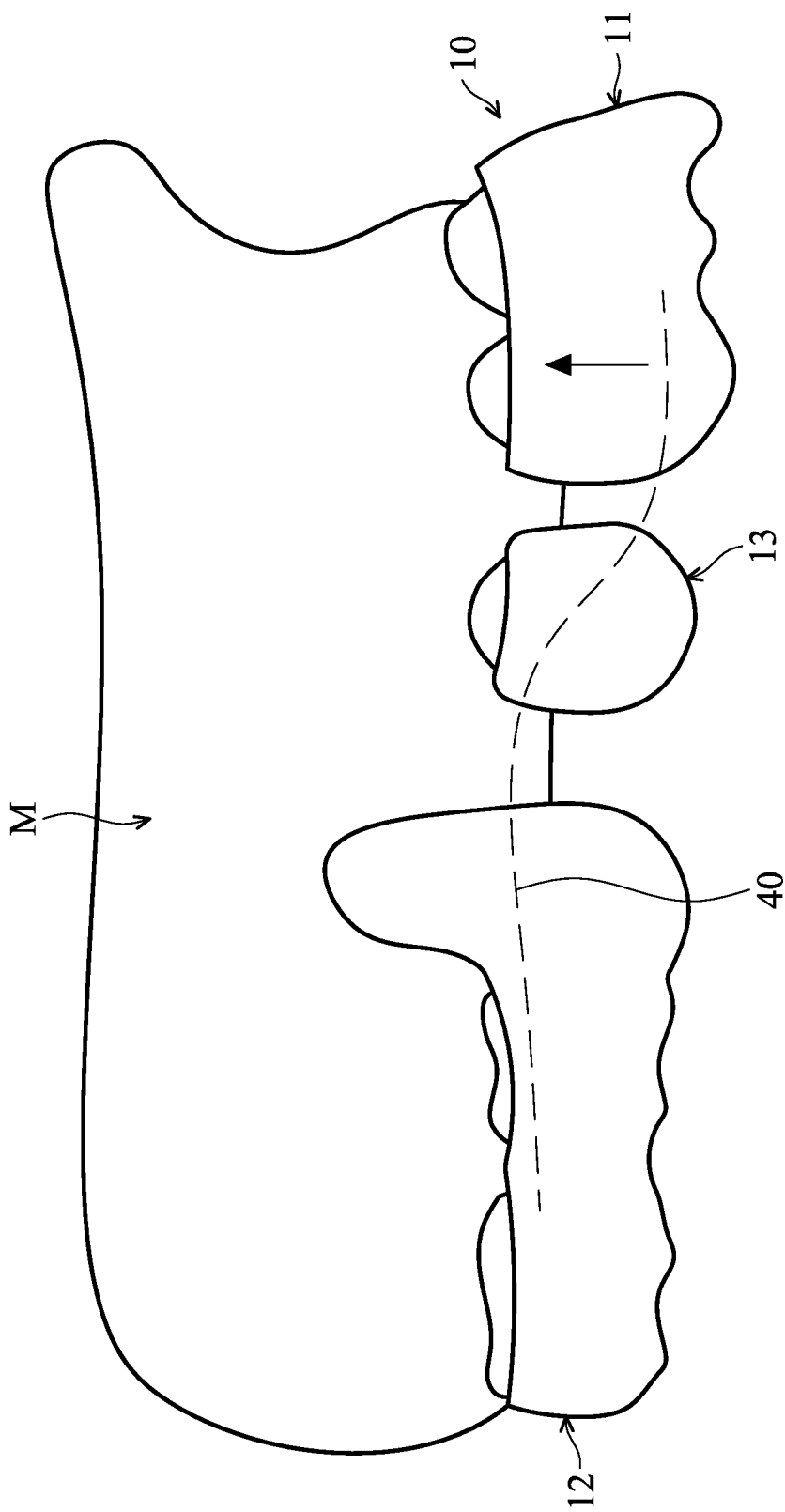
FIG. 3 is a schematic side view showing the arrangement of the orthodontic archwire in FIG. 1, wherein the orthodontic archwire located on the lingual side is depicted by the dashed line.

In addition, the orthodontic archwire 40 may also apply a force to pull the first tooth cap unit 11 with the anterior teeth in the vertical or apical direction during retraction of the anterior teeth. For example, as shown in FIG. 3, by arranging the orthodontic archwire 40 (as depicted by the dashed line) so that its one segment engaging with the first tooth cap unit 11 and another one segment engaging with the second tooth cap unit 12 have a vertical height difference therebetween, the orthodontic archwire 40 applies an upward pull (as indicated by the arrow shown) on the first tooth cap unit 11 with the anterior teeth when the orthodontic archwire 40 tries to return to its original unengaged shape.

Figure 4:
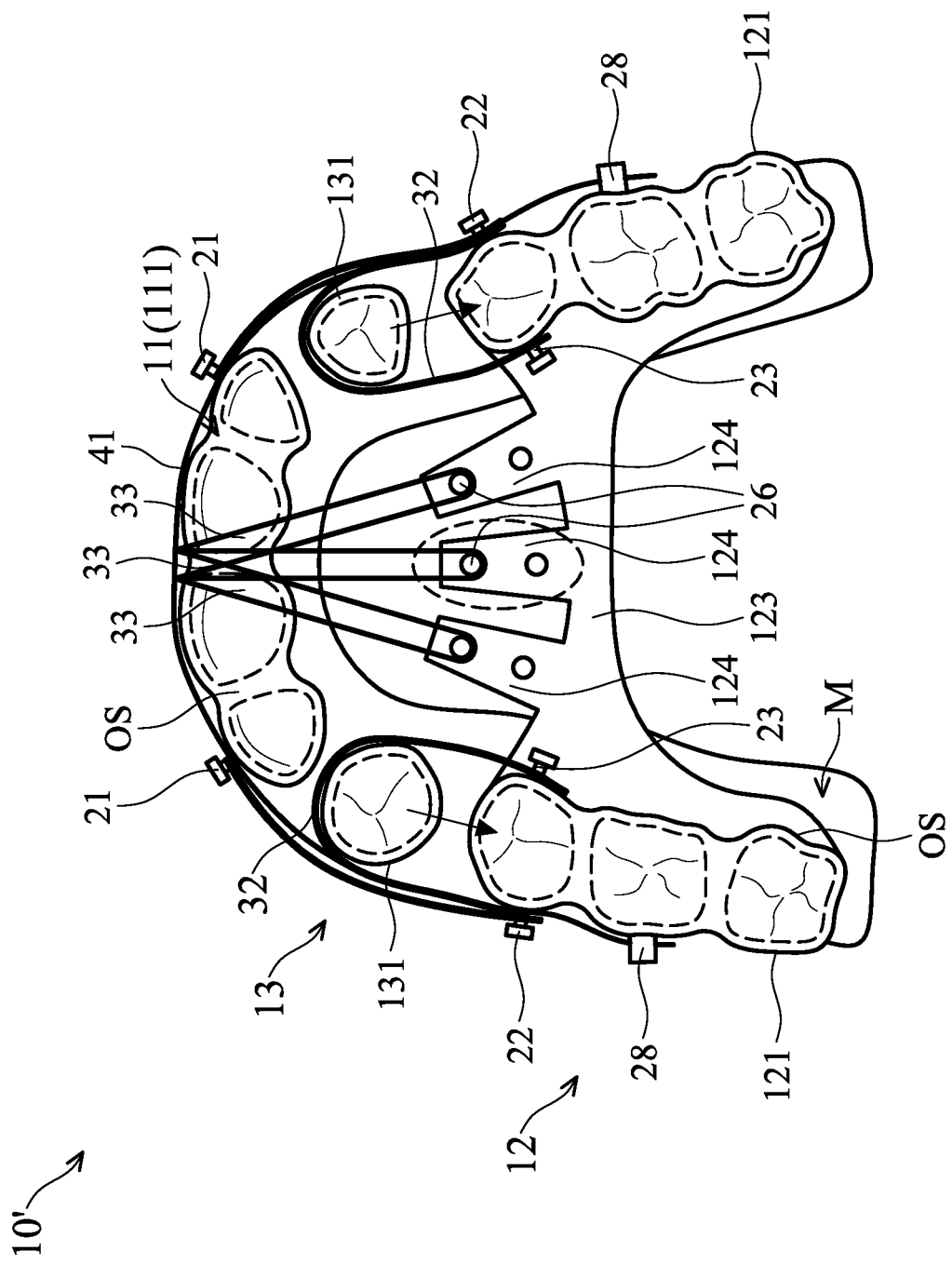
FIG. 4 is a schematic view showing an orthodontic space closure device in accordance with some embodiments being worn on a dental arch of a patient, when viewed from the occlusal surface of the device.
Figure 5:
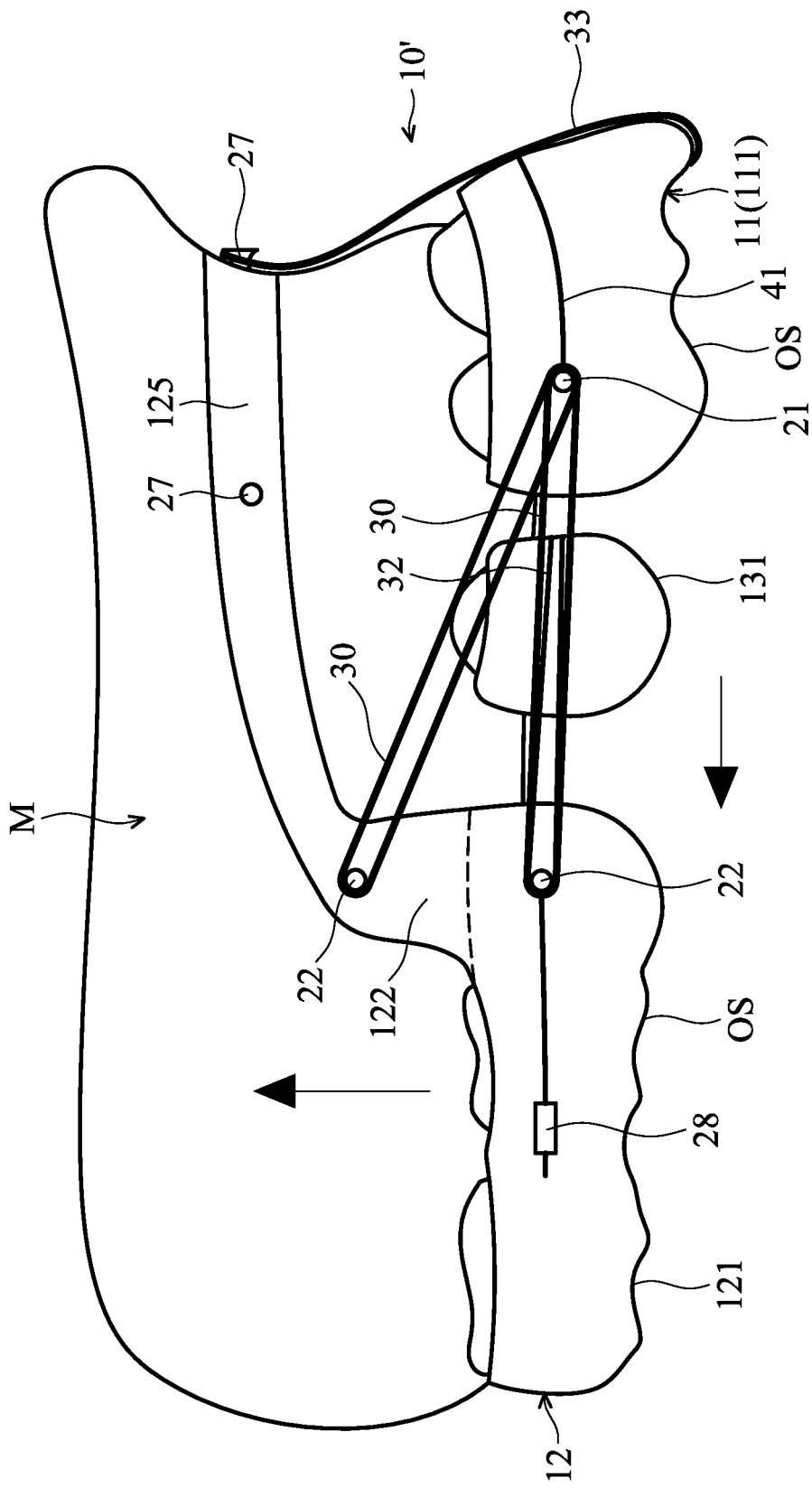
FIG. 5 is a schematic side view of the orthodontic space closure device in FIG. 4.

FIG. 4 is a schematic view showing another orthodontic space closure device 10' in accordance with some embodiments being worn on a dental arch of a patient, when viewed from the occlusal surface of the device. FIG. 5 is a schematic side view of the orthodontic space closure device 10' in FIG. 4. Similar to the orthodontic space closure device 10 described above, the orthodontic space closure device 10' (see FIGS. 4 and 5) includes a first tooth cap unit 11 and a second tooth cap unit 12. The first tooth cap unit 11 is configured to be removably worn on the anterior teeth (e.g., the incisors and lateral incisors) of a dental arch M (the maxillary or mandibular dental arch) to be retracted. The second tooth cap unit 12 is configured to be removably worn on the posterior teeth (e.g., the second premolars, first molars and second molars) and act as an anchorage for several elastic members to exert elastic correction forces on the anterior teeth inside the first tooth cap unit 11. Before the orthodontic space closure device 10' is worn, the first premolars are extracted so as to create a space for anterior teeth retraction.

Similar to the embodiments described above (FIGS. 1 and 2), the first tooth cap unit 11 includes a first tooth cap segment 111 for receiving the anterior teeth, and the second tooth cap unit 12 includes two second tooth cap segments 121 for receiving the posterior teeth on the left and right sides of the dental arch M. A number of first connectors 21 are fixed on the buccal sides of the first tooth cap unit 11. A number of second connectors 22 are also fixed on the buccal sides of the second tooth cap unit 12 (i.e., formed on the buccal side of each second tooth cap segment 121). Moreover, each second tooth cap segment 121 has a vertical extension part 122 formed on the buccal side and extending vertically in a direction away from the occlusal surface OS. One or more second connectors 22 are also fixed on the outer surface of the vertical extension part 122, so that each second connector 22 on the vertical extension part 122 and each first connector 21 on the buccal side of the first tooth cap unit 11 have a vertical height difference therebetween.

The orthodontic space closure device 10' also includes one or more elastic members 30 configured to couple the first connectors 21 fixed on the first tooth cap unit 11 to the second connectors 22 fixed on the second tooth cap unit 12. In some embodiments, as shown in FIG. 5, the orthodontic space closure device 10' includes several elastic members 30 coupling the first connectors 21 fixed on the buccal sides of the first tooth cap unit 11 to the second connectors 22 fixed on the buccal sides and the vertical extension parts 122. However, it should be appreciated that many variations and modifications can be made to the arrangement of the elastic members 30.

With the above configuration (in particular, the second tooth cap unit 12 includes the vertical extension parts 122 on both buccal sides and the second connectors 22 on the vertical extension parts 122), the elastic members 30 exert elastic traction forces having horizontal and vertical components (as indicated by the up and left arrows in FIG. 5) on the first tooth cap unit 11 to achieve retraction and intrusion of the anterior teeth while the second tooth cap unit 12 mounted on the posterior teeth acts as anchorage. As a result, the bowing effect occurring during the process of retraction is prevented.

The orthodontic space closure device 10' also includes a third tooth cap unit 13 consisting of two rigid shells or third tooth cap segments 131 (having a similar structure to the tooth cap segment 111 or 121) configured to be removably worn on the canines on both sides of the dental arch M, and includes a number of (e.g., two) elastic members 32 configured to couple the third tooth cap segments 131 of the third tooth cap unit 13 to the second tooth cap segments 121 of the second tooth cap unit 12. Accordingly, the elastic members 32 exert elastic traction forces on the third tooth cap segments 131 of the third tooth cap unit 13 to achieve horizontal retraction of the canines. Since the canines are retracted separately, retraction of the anterior teeth excluding the canines can be faster (i.e., the correction efficiency is improved).

The orthodontic space closure device 10' differs from the orthodontic space closure device 10 of the above embodiments in that the second tooth cap unit 12 further includes a transverse bar 123 connecting the two second tooth cap segments 121 together. The transverse bar 123 is configured in a U-shape, and its anterior part is elevated (see FIG. 6). It should be noted that the U-shaped transverse bar 123 almost touches the palate or the floor of the mouth of the patient. More specifically, when the second tooth cap unit 12 is worn on the maxillary dental arch, the U-shaped transverse bar 123 almost touches the palate; whereas, when the second tooth cap unit 12 is worn on the mandibular dental arch, the U-shaped transverse bar 123 almost touches the floor of the mouth. Accordingly, the stability and retention of the second tooth cap unit 12 on the posterior teeth is increased, and the bowing effect is also prevented.

In some embodiments, as shown in FIG. 4, the second tooth cap unit 12 further includes a number of (e.g., three) anterior extension parts 124 extending anteriorly from the transverse bar 123. Each anterior extension part 124 has one or more connectors 26 (e.g., hooks, buttons, or the like) formed or fixed on the lingual side. However, there may be a single anterior extension part 124 extending anteriorly from the transverse bar 123 with several connectors 26 thereon in some other embodiments.

In some embodiments, as shown in FIG. 5, the second tooth cap unit 12 further includes a labial bar 125 connecting to the top ends of the two vertical extension parts 122 on the buccal sides of the two second tooth cap segments 121 and arranged along the vestibule (the maxillary or mandibular buccal vestibule) of the mouth of the patient. A number of connectors 27 (e.g., hooks, buttons, or the like) may be disposed along the labial bar 125.

Figure 6:
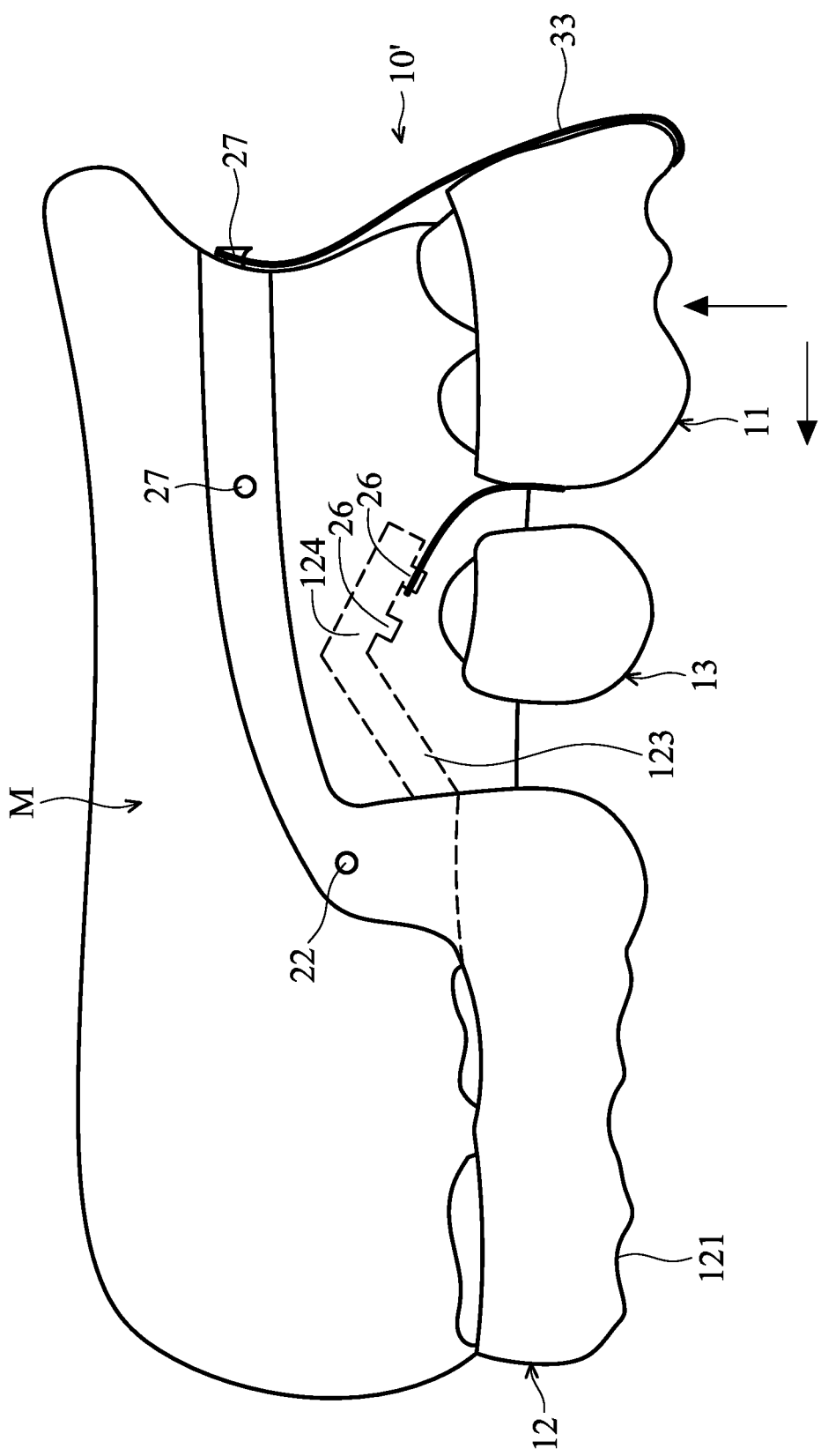
FIG. 6 is a schematic side view showing the structure of the transverse bar of the second tooth cap unit in FIG. 4, wherein the transverse bar located on the lingual side is depicted by the dashed line.

In some embodiments, as shown in FIGS. 4 and 6, the orthodontic space closure device 10' further includes one or more elastic members 33 (e.g., rubber bands or the like) configured to couple at least one connector 27 on the labial bar 125 to at least one connector 26 on the anterior extension parts 124 of the second tooth cap unit 12 and also extend across the occlusal surface OS of the first tooth cap unit 11. With these configurations, the elastic members 33 also exert elastic traction forces on the first tooth cap unit 11 to achieve retraction and intrusion of the anterior teeth ((as indicated by the up and left arrows in FIG. 6), thereby improving the correction efficiency. It should be realized that if only a single elastic member 33 is used to couple one connector 27 located at the central position of the labial bar 125 to one connector 26 on the central anterior extension part 124 (e.g., the one circled by the dashed line in FIG. 4) of the second tooth cap unit 12, the elastic member 33 mainly applies a force to pull the first tooth cap unit 11 with the anterior teeth in the vertical or apical direction. Accordingly, the bowing effect (i.e., the anterior teeth tend to tip distally) occurring during the process of retraction is prevented.

In some embodiments, the orthodontic space closure device 10' further includes an orthodontic archwire 41 (e.g., a thermal Ni—Ti wire) disposed along the labial side (see FIGS. 4 to 6). A number of connectors 28 (e.g., tubes, brackets, or the like) fixed on both buccal sides of the second tooth cap unit 12 and a number of first connectors 21 (e.g., tubes, brackets, or the like) fixed on both buccal sides of the first tooth cap unit 11 are used to install the orthodontic archwire 41. The orthodontic archwire 41 arranged along the labial side of the first tooth cap segment 111 can guide the first tooth cap unit 11 (and the anterior teeth) to move stably toward the second tooth cap unit 12.

Figure 7:
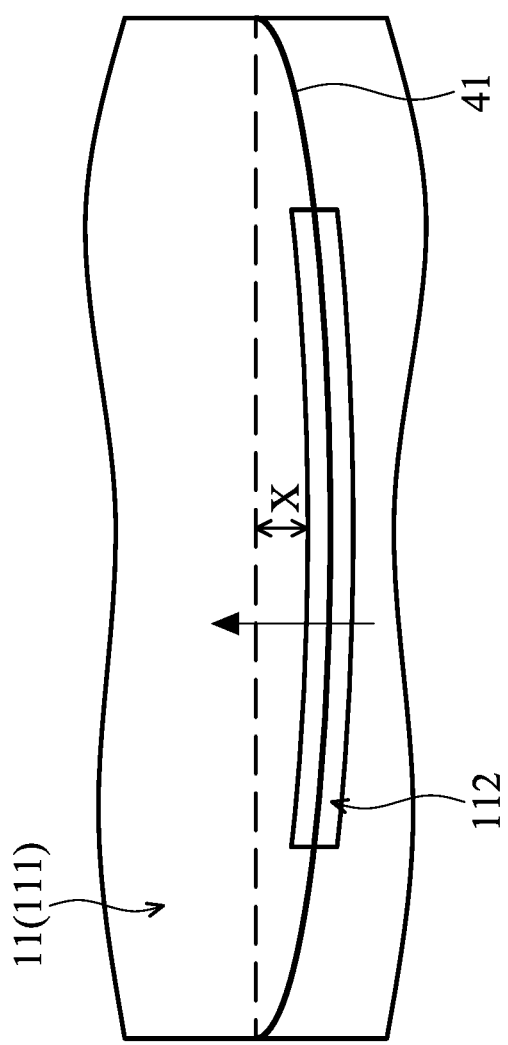
FIG. 7 is a schematic front view showing the orthodontic archwire in FIG. 4 being disposed on the labial side of the first tooth cap unit.

In some embodiments, as shown in FIG. 7, the labial side of the first tooth cap unit 11 also forms an archwire groove 112 for engaging with the orthodontic archwire 41. Furthermore, a vertical discrepancy X may occur between the archwire groove 112 and the orthodontic archwire 41 in its original unengaged shape (as indicated by the dashed line in FIG. 7). Accordingly, the orthodontic archwire 41 applies an upward pull (as indicated by the arrow in FIG. 7) on the first tooth cap unit 11 with the anterior teeth when the orthodontic archwire 41 tries to return to its original unengaged shape.

Figure 8:
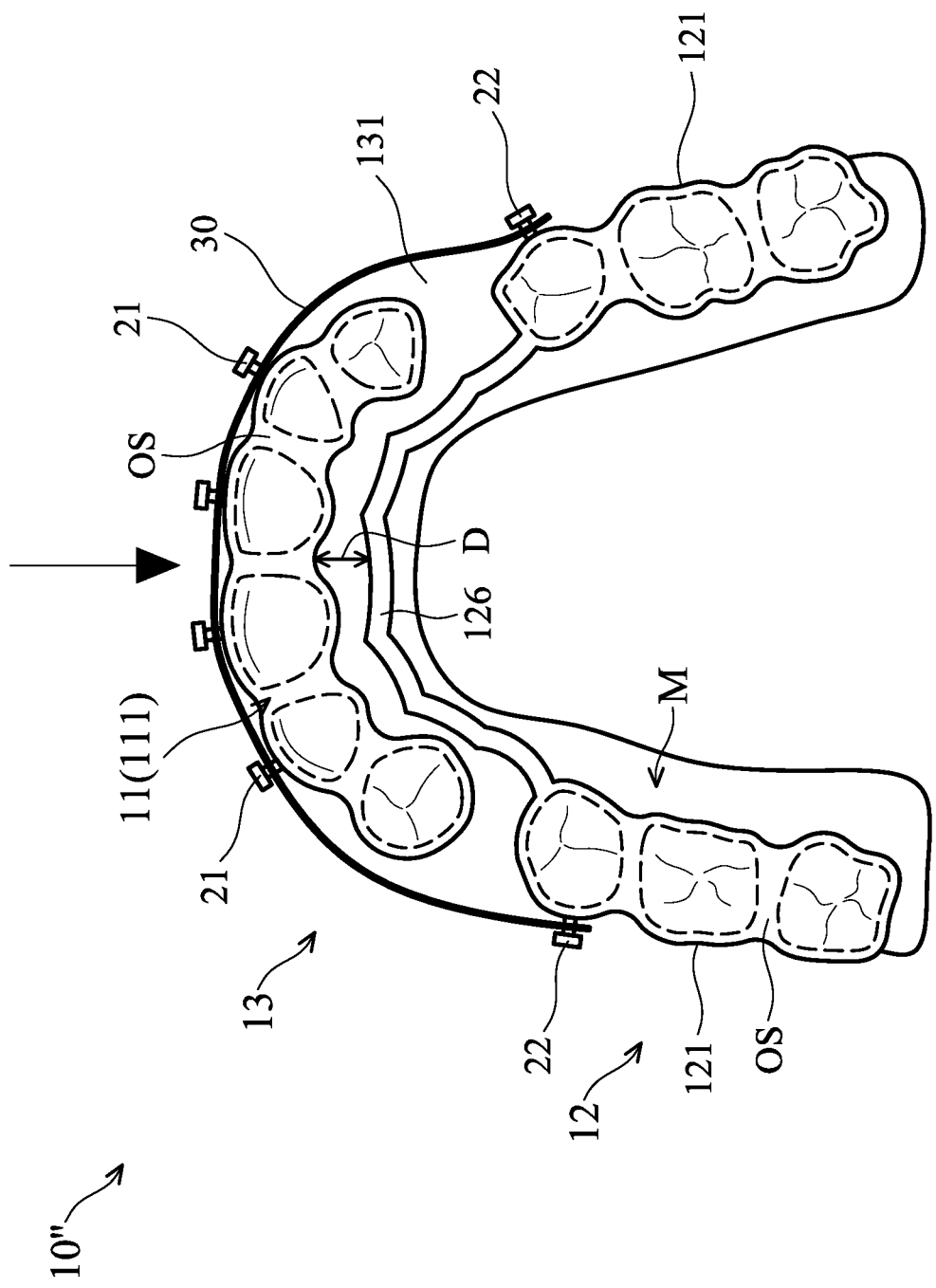
FIG. 8 is a schematic view showing an orthodontic space closure device in accordance with some embodiments being worn on a dental arch of a patient, when viewed from the occlusal surface of the device.

FIG. 8 is a schematic view showing another orthodontic space closure device 10" in accordance with some embodiments being worn on a dental arch of a patient, when viewed from the occlusal surface of the device. Common elements are labeled with the same reference numerals in the embodiments described above, and the same details are not repeated. The orthodontic space closure device 10" includes a first tooth cap unit 11 configured to be removably worn on the anterior teeth to be retracted, a second tooth cap unit 12 configured to be removably worn on the posterior teeth for acting as an anchorage, and one or more elastic members 30 configured to couple the first connectors 21 fixed on the first tooth cap unit 11 to the second connectors 22 fixed on both buccal sides of the second tooth cap unit 12 so as to exert elastic correction forces on the anterior teeth inside the first tooth cap unit 11. Although not shown, the second tooth cap unit 12 includes vertical extension parts 122 on both buccal sides with several connectors thereon. Accordingly, the elastic members 30 exert elastic traction forces having horizontal and vertical components on the first tooth cap unit 11 to achieve retraction and intrusion of the anterior teeth. As a result, the bowing effect occurring during the process of retraction is prevented.

The main difference between the orthodontic space closure device 10" and the orthodontic space closure devices of the above embodiments is that the second tooth cap unit 12 further includes an anterior teeth stop position plate 126 extending from the two second tooth cap segments 121 and having a shape for receiving the first tooth cap unit 11 (or the anterior teeth) at their target retracted positions. For example, the anterior teeth stop position plate 126 may be positioned so that when the first tooth cap unit 11 (or the anterior teeth) moves a certain distance D (FIG. 8) toward the second tooth cap unit 12 and the correction spaces (between the anterior teeth and the posterior teeth) are closed, the anterior teeth stop position plate 126 abuts against the first tooth cap unit 11 (or the anterior teeth). Through such a design, the distance that the first tooth cap unit 11 (or the anterior teeth) can retract toward the second tooth cap unit 12 is precisely determined. In some embodiments, a first tooth cap unit 11 is not used, and the elastic members 30 are directly coupled to the connectors fixed on the anterior teeth to retract the anterior teeth toward the receiving anterior teeth stop position plate 126.

It should be understood that although the above orthodontic space closure devices are worn on single dental arch, they can also be worn on both dental arches (i.e., the maxillary and mandibular dental arches) to treat bimaxillary protrusion. In such cases, a tab, a guiding plane, or surface is formed on the occlusal surface of the first tooth cap unit for contacting the lower incisors during long-centric movements of the lower jaw.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An orthodontic space closure device, comprising:
a first tooth cap unit configured to be removably worn on anterior teeth of a dental arch of a patient, wherein at least one first connector is fixed on each buccal side of the first tooth cap unit;
a second tooth cap unit configured to be removably worn on posterior teeth of the dental arch, wherein a vertical extension part is formed on each buccal side of the second tooth cap unit and extends vertically in a direction perpendicular to and away from an occlusal surface of the second tooth cap unit, and at least one second connector is fixed on each vertical extension part and arranged along the direction; and
a plurality of elastic members coupling the first connectors on the buccal sides of the first tooth cap unit to the second connectors on the buccal sides of the second tooth cap unit, thereby exerting elastic traction forces having horizontal and vertical components on the first tooth cap unit to achieve retraction and intrusion of the anterior teeth.

2. The orthodontic space closure device as claimed in claim 1, wherein a second connector and each of the first connectors have a vertical height difference therebetween.

3. The orthodontic space closure device as claimed in claim 1, wherein the second tooth cap unit includes two second tooth cap segments configured to be removably worn on the posterior teeth, and each of the second tooth cap segments has a vertical extension part formed on its buccal side.

4. The orthodontic space closure device as claimed in claim 3, further comprising:
a third tooth cap unit including two third tooth cap segments configured to be removably worn on two canines of the dental arch between the anterior teeth excluding the canines and the posterior teeth; and
a plurality of additional elastic members coupling the third tooth cap segments to the second tooth cap segments, thereby exerting elastic traction forces on the third tooth cap segments to achieve retraction of the canines.

5. The orthodontic space closure device as claimed in claim 3, wherein the second tooth cap unit further includes a transverse bar connecting the two second tooth cap segments together, and the transverse bar extends toward and almost touches a palate or a floor of the mouth of the patient.

6. The orthodontic space closure device as claimed in claim 5, wherein at least one anterior extension part extending anteriorly from the transverse bar, and at least one third connector is formed on the anterior extension part.

7. The orthodontic space closure device as claimed in claim 6, wherein the second tooth cap unit further includes a labial bar connecting to top ends of the vertical extension parts on the buccal sides of the two second tooth cap segments and arranged along a vestibule of the mouth of the patient, and at least one fourth connector is formed on the labial bar.

8. The orthodontic space closure device as claimed in claim 7, further comprising an additional elastic member coupling the fourth connector on the labial bar to the third connector on the anterior extension part and extending across the first tooth cap unit, thereby exerting elastic traction forces on the first tooth cap unit to achieve retraction and/or intrusion of the anterior teeth.

9. The orthodontic space closure device as claimed in claim 1, wherein a plurality of fifth connectors are arranged on the buccal sides of the second tooth cap unit, and the orthodontic space closure device further comprises an orthodontic archwire engaging with the first connectors on the buccal sides of the first tooth cap unit and the fifth connectors and arranged along a labial side of the first tooth cap unit so as to guide movement of the first tooth cap unit.

10. The orthodontic space closure device as claimed in claim 9, wherein the labial side of the first tooth cap unit forms an archwire groove for engaging with the orthodontic archwire, and a vertical discrepancy occurs between the archwire groove and the orthodontic archwire in its original unengaged shape.

* * * * *